(12) United States Patent
Bethuy et al.

(10) Patent No.: US 7,156,259 B2
(45) Date of Patent: Jan. 2, 2007

(54) BEVERAGE FORMING AND DISPENSING SYSTEM

(75) Inventors: Timothy W. Bethuy, New Fairfield, CT (US); William J. Black, Bethel, CT (US); Brian T. Cahill, Oak Creek, WI (US); Andrew D. Nelson, Appleton, WI (US); Peter D. Mehn, Oshkosh, WI (US)

(73) Assignee: Pepsico, Inc., Purchase, NY (US)

( * ) Notice: Subject to any disclaimer, the term of this patent is extended or adjusted under 35 U.S.C. 154(b) by 140 days.

(21) Appl. No.: 10/940,142

(22) Filed: Sep. 14, 2004

(65) Prior Publication Data

US 2005/0035152 A1 Feb. 17, 2005

Related U.S. Application Data

(62) Division of application No. 10/412,681, filed on Apr. 14, 2003.

(60) Provisional application No. 60/380,849, filed on May 17, 2002.

(51) Int. Cl.
*B67D 5/08* (2006.01)
*B67D 5/56* (2006.01)

(52) U.S. Cl. ............... 222/57; 222/59; 222/129.2

(58) Field of Classification Search ............... 222/23, 222/54, 57, 59, 129.1, 129.2
See application file for complete search history.

(56) References Cited

U.S. PATENT DOCUMENTS

| | | | |
|---|---|---|---|
| 3,122,162 A | 2/1964 | Sands | |
| 3,317,184 A | 5/1967 | Usry | |
| 3,659,631 A | 5/1972 | Rakoske | |
| 3,688,947 A | 9/1972 | Reichenberger | |
| 3,703,273 A | 11/1972 | Illing | |
| 3,710,981 A * | 1/1973 | Arzberger et al. | 222/129.1 |
| 3,920,149 A | 11/1975 | Fortino et al. | |
| 3,948,419 A | 4/1976 | Polster | |
| 3,949,903 A | 4/1976 | Benasutti et al. | |
| 4,486,053 A | 12/1984 | Hawker et al. | |
| 4,487,333 A | 12/1984 | Pounder et al. | |
| 4,550,858 A | 11/1985 | Noomen | |
| 4,664,292 A | 5/1987 | Jeans | |
| 4,665,809 A | 5/1987 | Aschberger et al. | |
| 4,718,443 A | 1/1988 | Adney et al. | |
| 4,766,921 A | 8/1988 | Williams | |
| 4,798,527 A | 1/1989 | Gunda | |
| 4,821,925 A | 4/1989 | Wiley et al. | |
| 4,890,774 A | 1/1990 | Poore | |
| 4,907,741 A * | 3/1990 | McIntyre | 239/124 |
| 4,936,488 A * | 6/1990 | Austin | 222/129.1 |
| 4,953,754 A * | 9/1990 | Credle, Jr. | 222/129.2 |
| 4,979,639 A | 12/1990 | Hoover et al. | |
| 5,000,357 A | 3/1991 | Shannon et al. | |

(Continued)

*Primary Examiner*—Joseph A. Kaufman
(74) *Attorney, Agent, or Firm*—Banner & Witcoff, Ltd.

(57) ABSTRACT

A beverage dispensing system includes separate valves for controlling the flow rate of a diluent and a concentrate. Various concentrates of different viscosities can be used and the selected concentrate is identified. The flow rate of the concentrate is determined based on temperature and pressure and on information related to the identified concentrate. The valves are controlled so that the concentrate and diluent reach target flow rates. The target flow rates satisfy a target ratio of diluent to concentrate. If the actual flow rates cannot reach the target flow rates, then the target flow rates are modified to satisfy the target ratio. The structure of the concentrate valve is designed to accommodate proportional metering of any one of the various concentrates.

5 Claims, 9 Drawing Sheets

U.S. PATENT DOCUMENTS

| | | |
|---|---|---|
| 5,012,955 A | 5/1991 | Shannon |
| 5,033,644 A | 7/1991 | Tentler |
| 5,033,645 A | 7/1991 | Shannon et al. |
| 5,062,555 A | 11/1991 | Whigham et al. |
| 5,068,116 A | 11/1991 | Gibney et al. |
| 5,102,011 A | 4/1992 | Whigham et al. |
| 5,106,053 A | 4/1992 | Miller et al. |
| 5,251,655 A | 10/1993 | Low |
| 5,303,846 A | 4/1994 | Shannon |
| 5,312,017 A | 5/1994 | Schroeder et al. |
| 5,332,123 A | 7/1994 | Farber et al. |
| 5,360,140 A | 11/1994 | Senghaas |
| 5,454,406 A | 10/1995 | Rejret et al. |
| 5,603,430 A | 2/1997 | Loehrke et al. |
| 5,730,324 A | 3/1998 | Shannon et al. |
| 5,731,981 A | 3/1998 | Simard |
| 5,823,388 A | 10/1998 | Green |
| 5,842,603 A | 12/1998 | Schroeder et al. |
| 5,868,279 A | 2/1999 | Powell |
| 5,960,997 A | 10/1999 | Forsythe |
| 6,092,693 A | 7/2000 | Powell |
| 6,116,230 A | 9/2000 | Clifford et al. |
| 6,220,747 B1 | 4/2001 | Gosselin |
| 6,354,468 B1 | 3/2002 | Riek |
| 6,364,159 B1 | 4/2002 | Newman et al. |
| 6,374,845 B1 | 4/2002 | Melendez et al. |
| 6,412,594 B1 | 7/2002 | Small et al. |
| 6,450,369 B1 | 9/2002 | Heyes |
| 6,536,626 B1 | 3/2003 | Newman et al. |
| 6,550,641 B1 | 4/2003 | Newman et al. |
| 6,550,642 B1 | 4/2003 | Newman et al. |
| 2004/0217130 A1 * | 11/2004 | Kado et al. .............. 222/129.1 |

* cited by examiner

BEVERAGE FORMING AND DISPENSING SYSTEM

This application is a divisional of and claims priority to and the benefit of U.S. patent application Ser. No. 10/412,681, which was filed on Apr. 14, 2003 and which claimed priority to and the benefit of U.S. Provisional Patent Application Ser. No. 60/380,849, filed on May 17, 2002.

BACKGROUND OF THE INVENTION

1. Field of the Invention

The present invention relates to beverage forming and dispensing systems. More particular, the present invention relates to beverage forming and dispensing systems for effectively preparing a beverage mixture from concentrate, and even more particularly to beverage forming and dispensing systems for effectively monitoring and controlling the quality of a post-mix product. The present invention further relates to a dispensing valve assembly of a single design that can be used with any of various types of concentrates.

2. Description of the Related Art

Beverages formed from concentrate are enjoyed around the world. An important advantage of forming a beverage from a concentrate is that only the concentrate need be shipped to the dispensing site; any available water supply at the site can be used to form the bulk of the final mixed product. A typical application of forming a beverage from a concentrate is a post-mix beverage dispensing system, commonly referred to as a fountain system, that mixes a syrup concentrate with carbonated water to form a beverage.

Improving the quality of fountain beverages to meet the goal of a "bottle quality" carbonated beverage delivered by on-premise fountain equipment has been a long, ongoing process. Fountain equipment must consistently carbonate water to proper $CO_2$ volumes, cool product to the desired serving temperature and dispense water and syrup at a precise ratio to deliver the consumer's drink with the desired quality. All this critical functionality must be delivered from a piece of equipment a fraction of the size and cost of traditional bottle-plant equipment and with none of the rigorous plant maintenance procedures performed on a daily basis. Nevertheless, this quality goal has driven many design initiatives with varying degrees of success.

Standard beverage valves require manual adjustment of water-to-syrup ratio and readjustment based on seasonal changes in temperature. In such dispensers, trained technicians must adjust carbonators during summer months when the water temperature is higher. After adjusting the carbonator, the technician must then readjust the water-to-syrup ratio of each valve, which can take a significant amount of time and result in significant cost. Although ideally such standard beverage valves are intended to maintain a correct water-to-syrup ratio once adjusted, in reality the ratio needs to be adjusted periodically to maintain a proper tasting beverage. Further, such valves require periodic cleaning.

Other known devices provide means to regulate syrup flow only, but only for a very limited set of operational conditions.

SUMMARY OF THE INVENTION

The present invention can provide a system for improving the quality of a dispensed beverage from a carbonated beverage forming and dispensing system.

The present invention can also provide a system for controlling the concentrate and water supplies in a beverage forming and dispensing system to control the quality of a dispensed beverage.

The present invention can still further provide a system that can change the control of the brixing ratio to that corresponding to any one of a number of concentrates.

In addition, the present invention can provide a system that can dispense water and concentrate at a desired ratio throughout its lifetime without maintenance or adjustment.

Still further, the present invention can provide a system including a nozzle assembly in which the internal components of the nozzle assembly can be kept free of incursion of liquid.

These and other aspects, objects, and features of the present invention will become apparent from the following detailed description of the preferred embodiments, read in conjunction with, and reference to, the accompanying drawings.

DETAILED DESCRIPTION OF THE PREFERRED EMBODIMENTS

Figure 1:
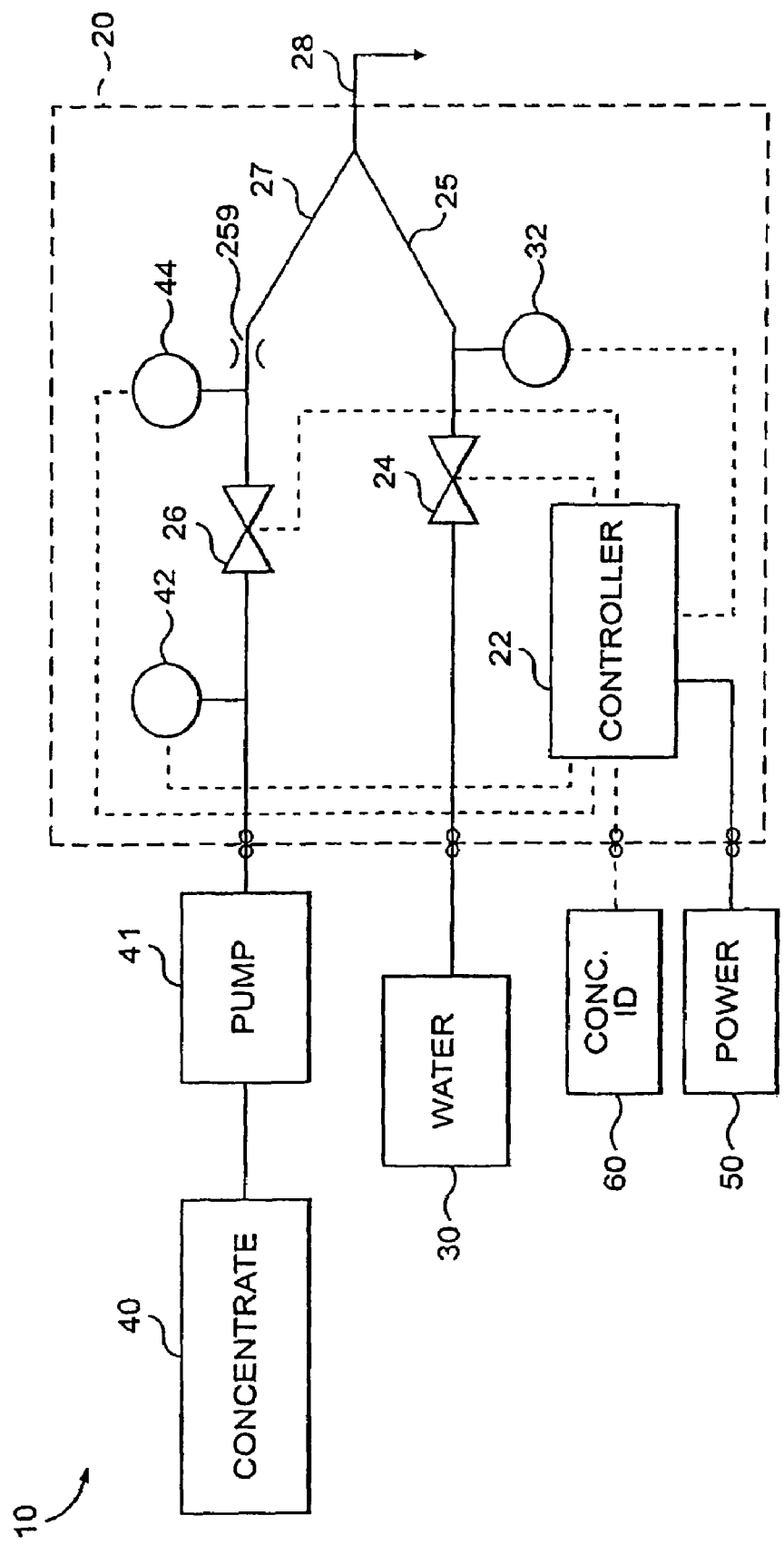
FIG. 1 is a schematic diagram of the control arrangement of the beverage dispensing system of the present invention.

FIG. 1 depicts a schematic diagram of the beverage forming and dispensing system 10 according to the present invention. System 10 includes a valve assembly 20, a carbonated water supply 30, a syrup or concentrate supply 40 and a power supply 50. Valve assembly 20 is mountable on a well-known base or tower (not shown), through which the concentrate, carbonated water and power is supplied.

Valve assembly 20 includes a controller 22, such as a microprocessor, for controlling the flow rate of the carbonated water and concentrate at a predetermined ratio or brix. Microprocessor 22 is powered through power source 50, which can include transformers to provide a DC voltage. Carbonated water source 30 can include a well-known carbonator tank and a cold plate (unshown) to chill the water supply, if desired. Concentrate supply 40 can be in the form of a bag-in-box type and the concentrate is typically pumped by a concentrate pump 41.

Valve assembly 20 includes two flow control units or devices 24, 26. Flow control device 24 controls the flow rate of the carbonated water and flow control device 26 controls the flow rate of the concentrate. These flow control devices can be formed integrally or separately within the valve assembly. Each flow control device is in the form of a solenoid-operated valve that can be controlled by pulsewidth modulation (PWM) by microprocessor 22.

Figure 3A:
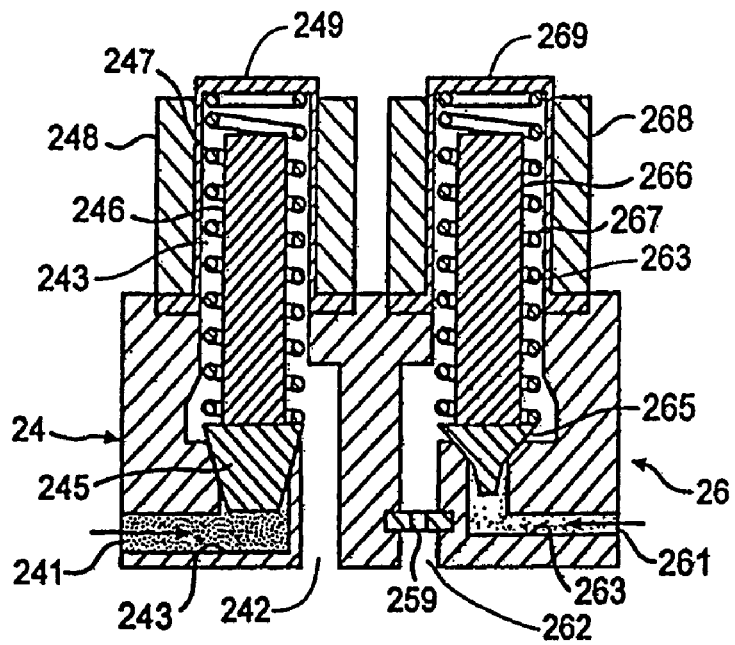
FIG. 3A is an idealized cross-sectional view of the valve assembly according to the first embodiment of the present invention with the individual valves in a closed state.
Figure 3B:
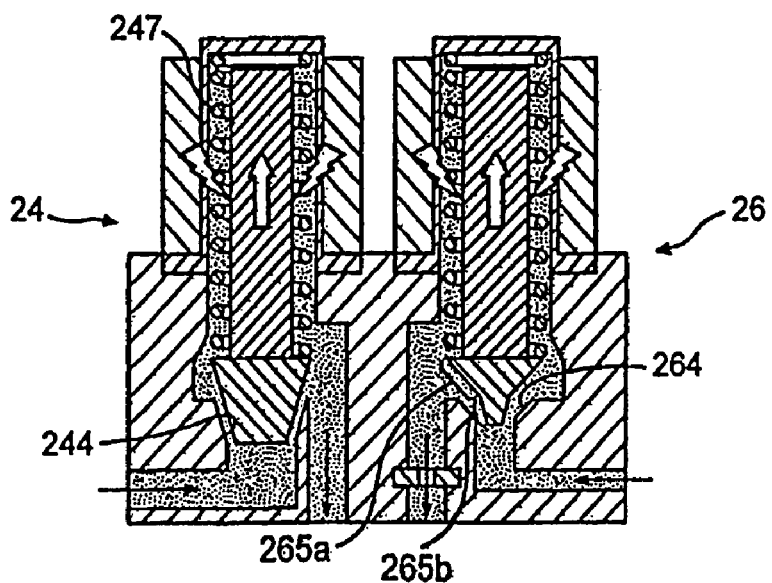
FIG. 3B shows the valve assembly of FIG. 3A with the valves in an open state.

Referring to FIGS. 3A and 3B, the flow control devices will be described. Each flow control device 24, 26 includes a valve inlet 241, 261 and a valve outlet 242, 262, formed in a valve body. Valve inlets and outlets communicate through valve passages 243, 263, in which valve seats 244, 264 are formed. A restriction 259 of a predetermined orifice size is inserted in concentrate flow path 263. Conical poppets or valve members 245, 265 are formed complementarily to valve seats 244, 264 to selectively engage therewith to close and open the valve passages to varying degrees. Valve shafts 246, 266 are connected to poppets 245, 265 and act as a plunger or armature of a solenoid. Coils 248, 268 are energized and de-energized by pulsewidth modulated signals from microprocessor 22 to control movement of the poppets. The valves are normally closed by springs 247, 267, which bias poppets 245, 265 into engagement with valve seats 244, 264. Energization of the solenoids moves the poppets away from the valve seats to open the valves.

Poppet 245 of water flow control unit 24 is of a single conical or truncated conical shape. As poppet 245 is lifted by action of its solenoid, the gap between the poppet and valve seat 244 increases. The flow rate of water through flow passage 243 is substantially proportional to the distance the poppet is raised. Since the viscosity of carbonated water is substantially the same between its freezing and boiling points, the flow rate of water through regulator 24 can be accurately controlled regardless of temperature.

On the other hand, poppet 265 of syrup flow control unit 26 is of a geometry that is more compound than that of water poppet 245. As shown in FIG. 3B, poppet 265 is formed of two conical or truncated conical sections 265a, 265b. Section 265a, which is closer to armature 266, is formed from a cone of larger dimensions than that of section 265b. Section 265a fits complementary within valve seat 264 and will shut off flow of concentrate through passage 263 when fully seated. The reason for the compound geometry of poppet 265 is to accommodate concentrates of a wide range of viscosities. For example, with syrups closer to the viscosity of water, a gap between section 265a of poppet 265 and seat 264 is used to control the flow rate, whereas concentrates of higher viscosities can be controlled with a gap between section 265b of poppet 265 and the valve seat. As with flow control unit 24, flow of concentrate through flow control unit 26 is substantially proportional to the distance the relevant section 265a or 265b is moved.

Figure 2:
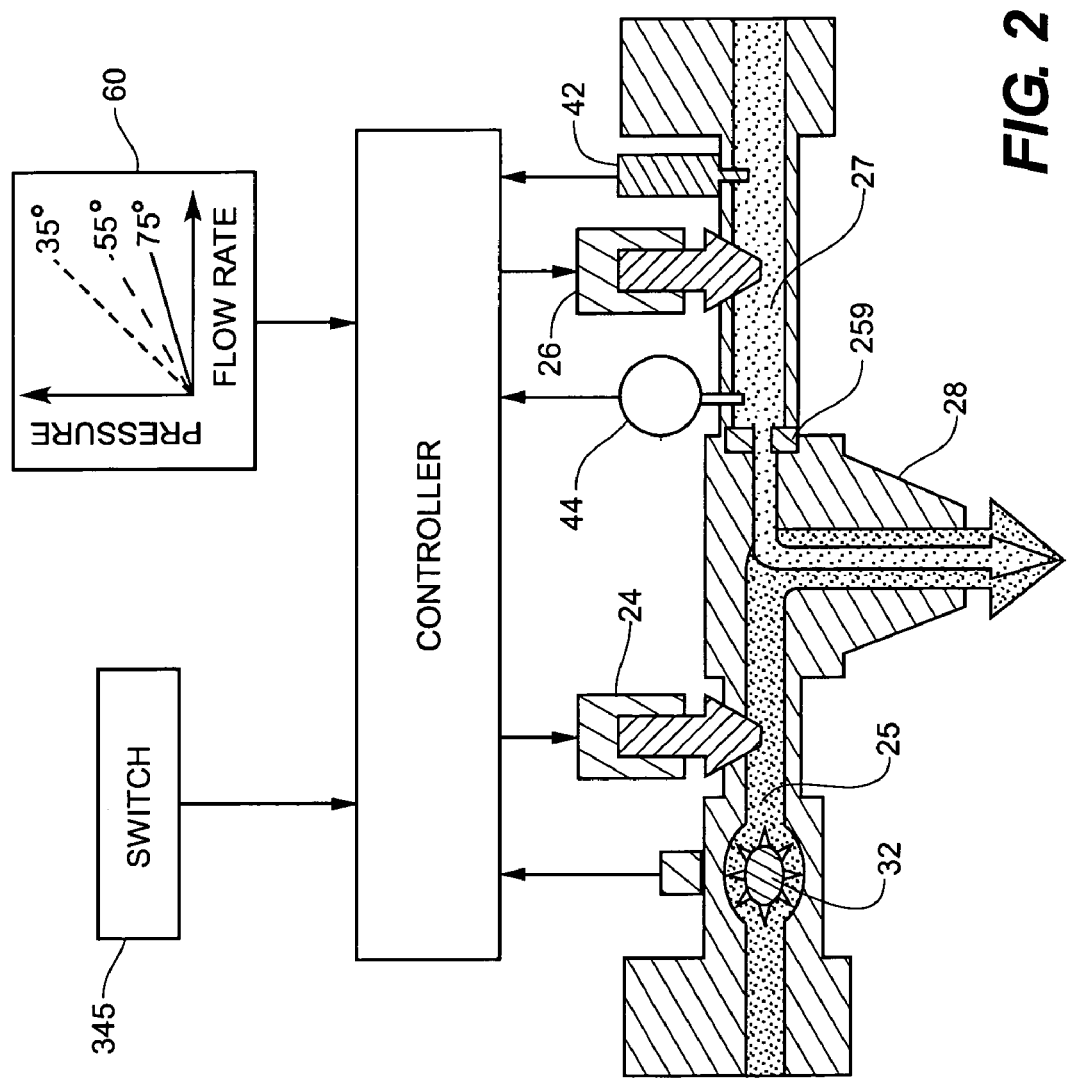
FIG. 2 is a schematic view of the valve assembly according to one embodiment of the present invention.

Referring again to FIG. 1 and to FIG. 2, measurement of the flow rates for concentrate and water will be described. The outlets of flow control units 24, 26 are connected to outlet passages 25, 27, which converge in a nozzle 28. A flow sensor 32 is provided in water outlet passage 25. Sensor 32 is preferably in the form of a turbine flow meter, for example. Water flowing through outlet 25 turns the turbine so that the rotations of the turbine over time are proportional to the flow rate. A sensor utilizing the Hall effect can count the rotations of the turbine and send the count back to microprocessor 22. Alternatively, sensor 32 can be positioned upstream of flow control unit 24 (as shown in FIG. 2).

Two sensors are provided in the syrup line. A syrup temperature sensor 42 can be provided either upstream or downstream of flow control unit 26. Temperature sensor 42 can be in the form of a thermistor and measures the temperature of the syrup. A pressure sensor 44, such as a pressure transducer, is provided so as to detect the pressure of the syrup between poppet 265 of flow controller 26 and restriction 259. Pressure sensor 44 measures the back pressure in the syrup created by restriction 259. When the detected temperature and pressure of the syrup are fed back to microprocessor 22, the flow rate of the concentrate can be readily determined.

Restriction 259 is placed in the syrup passage to create a significant pressure drop. Pressure drop values differ from one concentrate to another because the viscosity of the various concentrates also differ. The temperature of the concentrate is measured because temperature affects viscosity. Program algorithms can be used to determine the flow rate for any syrup based on inputs of temperature and pressure.

The type of syrup or concentrate supplied to the system can be identified a number of ways. For example, a microchip associated with a particular syrup can be connected to controller 22 to provide the information necessary for controlling that particular concentrate. Alternatively, the information can be pre-stored in the controller and an operator can select which syrup is being supplied to the unit. Still further, other means to identify the syrup can be used such as bar code or magnetic strip reading and radio frequency identification. As shown in FIG. 1, a concentrate identification unit 60 is used to represent any one of these modes of inputting the concentrate information.

The functions of controller 22 will now be described in more detail. The control algorithm of control software in controller 22 can be divided into three functional groups: background system functions, an inner control loop and an outer control loop. The background system functions are basic functions needed to measure input data or generate output signals from the control software. These functions are generally simple repetitive tasks that can be executed quickly. The background system functions can include 1) analog sensor input conversion in which the signals from the analog pressure and temperature sensors 42, 44 are digitized, 2) digital count or timing input measurement in which the signals from water flow sensor 32 are monitored, 3) sensor data noise filter averaging to compensate for any noise inputs, 4) operator interface input state sensing to determine whether an operator has activated the system, 5) a logical input de-bounce filter function and 6) timing for PWM outputs. At regularly scheduled intervals, each input sensor value can be measured and a new filtered or average value updated for each sensor. At scheduled intervals, the operator interface inputs are sampled and the logical state is determined by a noise-filtering or de-bouncing process.

The inner control loop controls the water and concentrate flow control units 24, 26 during each dispensing cycle to provide respective flow rates with maximum response and stability. Controller 22 operates from averaged sensor data to control water and syrup flow rates to respective target values or set-points. The inner control loop has predefined process steps to analyze the determined actual flow rates and apply corrections needed to respective control PWM values. For example, if the measured or actual flow rate is greater than a target flow rate, the number of or width of pulses supplied to a particular valve can be increased to open the valve further and if the actual flow rate is less than the target flow rate, the number of pulses or width of the pulses can be decreased. The pulse corrections take into account the rate of change of the sensor value toward or away from the target flow rate and maximum change limits for correction allowed for any one updated cycle. The inner control loop can utilize either proportional feedback in which small errors are corrected by small corrections and large errors are corrected by large corrections, or differential feedback wherein the rate of change of the signal is taken into consideration. By applying pulses to the solenoids rather than a constant signal, the valve can be controlled to maintain a desired opening, while saving energy and avoiding overheating.

The outer control loop ensures that the ratio or brix of the water and concentrate is maintained. The outer control loop monitors the same average sensor parameters as the inner control loop, but converts the average sensor data to water and syrup flow data for each sample interval and tracks performance over each total dispense cycle to determine whether any changes are necessary in the inner control loop target flow rates. That is, if the measured water flow rate cannot meet the target water flow rate due to, for example, fluctuations in the pressure of the water supply, then the ratio of water to concentrate cannot be maintained unless the concentrate flow rate is also changed. Therefore, if the water and/or concentrate flow rates cannot meet the set target flow rates, the target flow rates are modified so as to be within a controllable flow rate range, that is, a flow rate that can be attained yet still meet the predetermined ratio.

Each dispense cycle starts from an average water pulse count or syrup pressure set point value established from memory defaults or the last valid dispense cycle. The current dispense ratio performance is reset with the start of each dispense cycle. As ratio performance is monitored, the outer control loop applies predetermined process steps to adjust the water or syrup target values to maintain the ratio performance within allowable limits. If the ratio performance needs correction, the outer control loop can take into account the rate of change of the ratio or relative positions of the water and syrup PWM counts within their operating ranges to calculate and update to the water and syrup inner loop target values.

Figure 9:
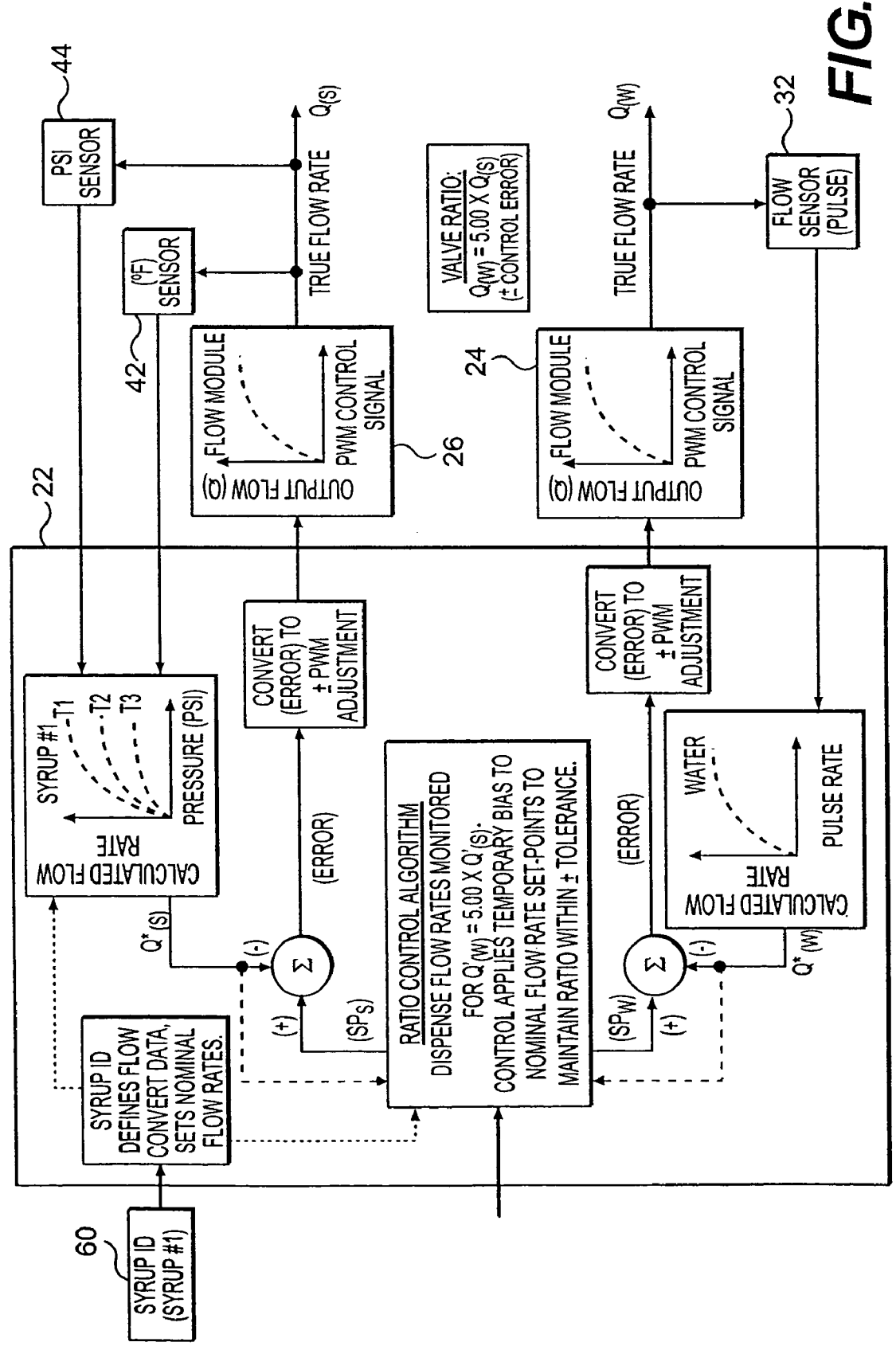
FIG. 9 is a functional diagram of the control algorithm according to the present invention.

Referring to FIG. 9, the control algorithm for the inner and outer loops will be described. The valve control algorithm begins in the inner loop with nominal syrup and water flow control target values or set-points. These can be derived from the concentrate identification information. The nominal flow rates are input to an outer loop bias value to create inner loop control targets or set-points $SP_s$ or $SP_w$. Calculated flow rate feedback $Q^*_{(s)}$, $Q^*_{(w)}$ is compared to the set-points and an error value (error) is calculated. Each error value is used to increase or decrease a flow control signal currently being applied to flow control unit 24, 26 so that the actual flow rate $Q_{(w)}$, $Q_{(s)}$ is controlled to be equal to a respective set-point value $SP_w$, $SP_s$. The resulting change in the flow control unit output is measured by respective sensors 32, 42, 44 and the sensor inputs are converted into updated feedback values. The updated values are used to adjust the PWM for a next inner loop cycle interval. The PWM cycle time is established by the highest update frequency for the flow control units and can range from 20–400 Hertz. If the PWM cycle time is taken to be 50 Hertz, for example, each PWM cycle has a total time value of 20 milliseconds. During each cycle, the flow control coil may be energized from 0–100% of the cycle time and can be adjustable in step increments of 1% resulting in a time resolution of 200 microseconds. The amount of adjustment to be applied is proportional to the calculated error and scaled to provide operational stability.

The outer loop monitors the performance of the inner loop flow rate feedback signals during each inner loop cycle interval. Water and syrup flow rates are continuously compared during each dispensing cycle to determine a present status of ratio accuracy for each dispensing cycle. When the calculated ratio accuracy for an individual dispense cycle exceeds an upper or lower acceptable control band value, a flow control bias value is calculated and applied to the respective inner loop flow control set points $SP_s$, $SP_w$ to keep the ratio accuracy within specification.

More particularly, at the end of each inner loop PWM cycle, the calculated flow rate feedback signals $Q^*_{(s)}$, $Q^*_{(w)}$, are analyzed by the outer loop algorithm. The syrup flow rate is assigned a scaled, flow value $FV_s$ and the water flow rate is assigned a scaled flow value $FV_w$. $FV_w$ is combined with $FV_s$ in such a manner that a dispense cycle ratio (DCR) value will be 0 if the water flow value is exactly 5 times greater than the syrup flow value (assuming a desired 5:1 mixing ratio). The DCR value is initialized at 0 for each dispense cycle and at the end of each PWM output cycle, the DCR value will contain the cumulative total of the individual cycles for the current dispense cycle. An operational ±error band will be established for the magnitude of the DCR value before set-point bias adjustment is applied. If the cumulative DCR value remains within the operational band, no bias adjustment is made. When the DCR value exceeds the error band magnitude threshold, a bias adjustment will be applied to the inner loop flow rate set-points until the DCR value is 0.

The outer loop algorithm determines which ±DCR band limit was crossed and the magnitude of the inner loop flow rate values operating when that limit was exceeded. If the DCR value limit indicates the ratio contains an excess of syrup and the syrup flow control module is currently operating near its minimum flow value, then the water flow control set-point $SP_w$ is increased until the DCR value returns to 0. When the DCR value returns to 0, bias adjustment is ceased. Likewise, if the DCR value limit indicates the ratio has an excess of syrup and the water flow is operating near maximum, then the syrup flow control set-point is decreased. If there is an excess of water and a syrup flow is operating near its minimum, then the syrup flow control set-point is increased. If there is an excess flow of water and the syrup flow is operating near its maximum, then the water flow control set-point is decreased. The amount of bias adjustment applied will be proportional to the error and scaled to provide operational stability.

The outer control loop also uses operator interface input data to control overall functions of the valve assembly. The outer control loop can also provide non-linear functions of the valve assembly, such as soft start/stop dispensing and syrup sold-out control. Soft start/stop dispensing can be defined as gradually increasing the PWM signals sent to the flow control units 24, 26 when dispensing starts and gradually decreasing those signals when dispensing stops so as to avoid "water hammer" effects. Syrup sold-out control can include monitoring the signal from pressure sensor 44 and if a minimum syrup pressure is not detected, then it is presumed the syrup supply is empty. The outer control loop should then control to cease dispensing of water and concentrate until reset.

Figure 4:
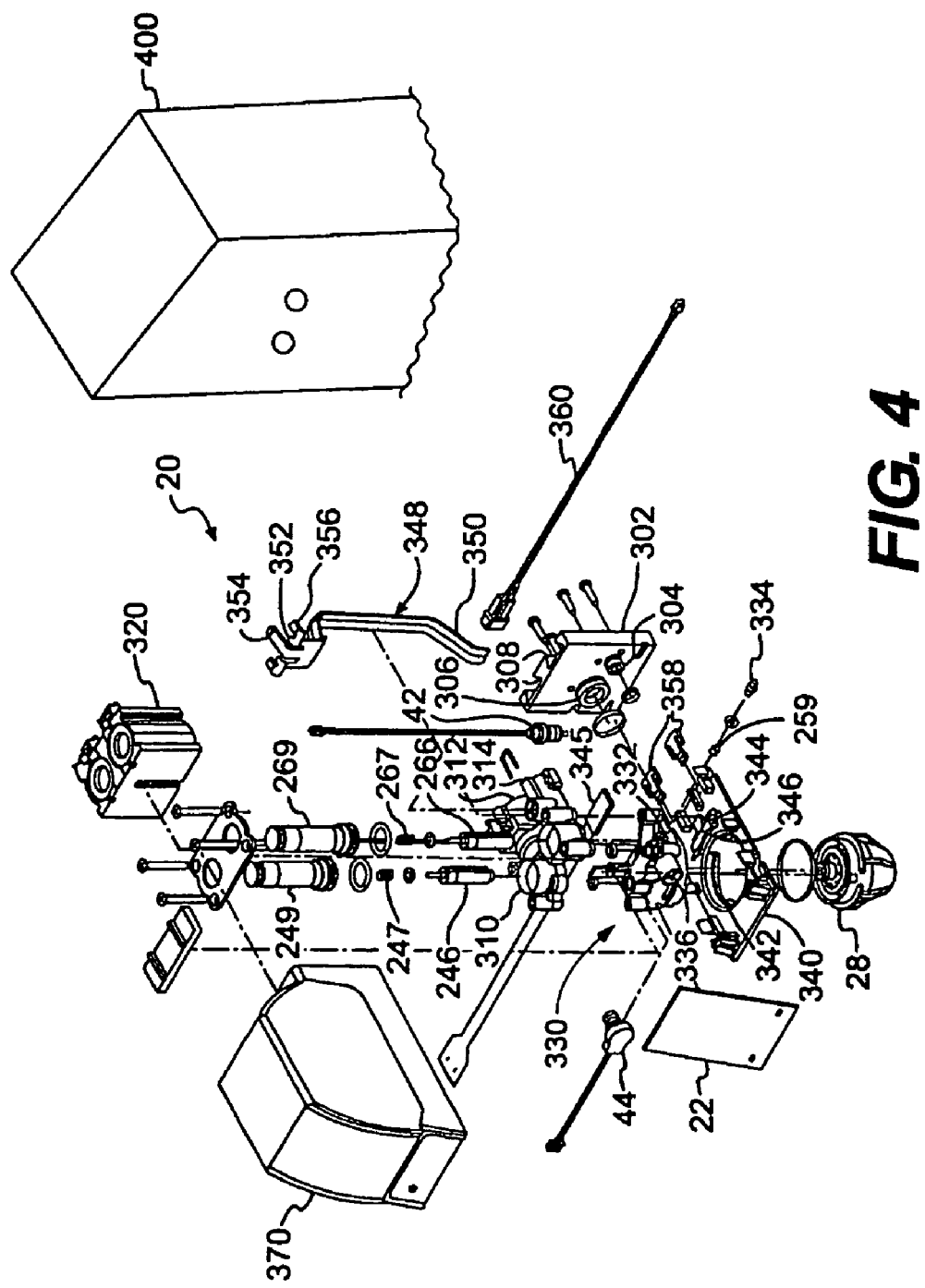
FIG. 4 is an exploded perspective view of the valve assembly according to the first embodiment of the present invention.

The physical structure of the valve assembly 20 according to the first embodiment of the present invention is shown in more detail in FIG. 4. Valve assembly 20 includes a back mounting plate 302 that is mountable on a conventional beverage dispensing tower or fountain base 400. Plate 302 includes inlet orifices 304, 306 for receiving concentrate and carbonated water supplied from the fountain base, and mounting holes 308, that engage with complementary mounting lugs on the base. A valve body 310 includes corresponding inlet ports 312, 314 to connect with the inlet orifices of the back mounting plate 302. Valve body 310 also includes the flow passages and valve seats described previously with reference to FIGS. 3A and 3B. The concentrate and water are received by the valve body laterally and discharged vertically downward through outlets. Valve body 310 is connected at its underside to a diverter block 330, which can receive a conventional diverter assembly 332 and certain sensors, as will be described later. Valve poppets 245, 265 are received in the upperside of valve body 310 and move vertically as described with respect to FIGS. 3A and 3B. The valve poppets and their corresponding springs 247, 267 are contained within valve tubes 249, 269, which guide their movement, and the valve tubes are received within coil assembly 320, which houses the coils 248, 268.

Valve body 310 can include a recess 322 for receiving a thermistor comprising the temperature sensor 42. In this embodiment, the temperature sensor senses the temperature of the syrup upstream of the valve. Diverter block 330 includes a port 332 in which restriction 259 can be inserted in the syrup passage therein. Restriction 259 is held in place by a plug 334. Upstream of the restriction port 332 in diverter block 330 is a recess 336 for receiving pressure transducer 44 for measuring the pressure of the syrup in the passage between the valve and the restriction. Controller 22 can be in the form of an electronic printed circuit board and can be positioned in front of the valve body 310 and diverter block 330. Various 0-rings and connectors such as screws and clips for assembling the components of the valve assembly are shown in the drawings, but not numbered.

Figure 5A:
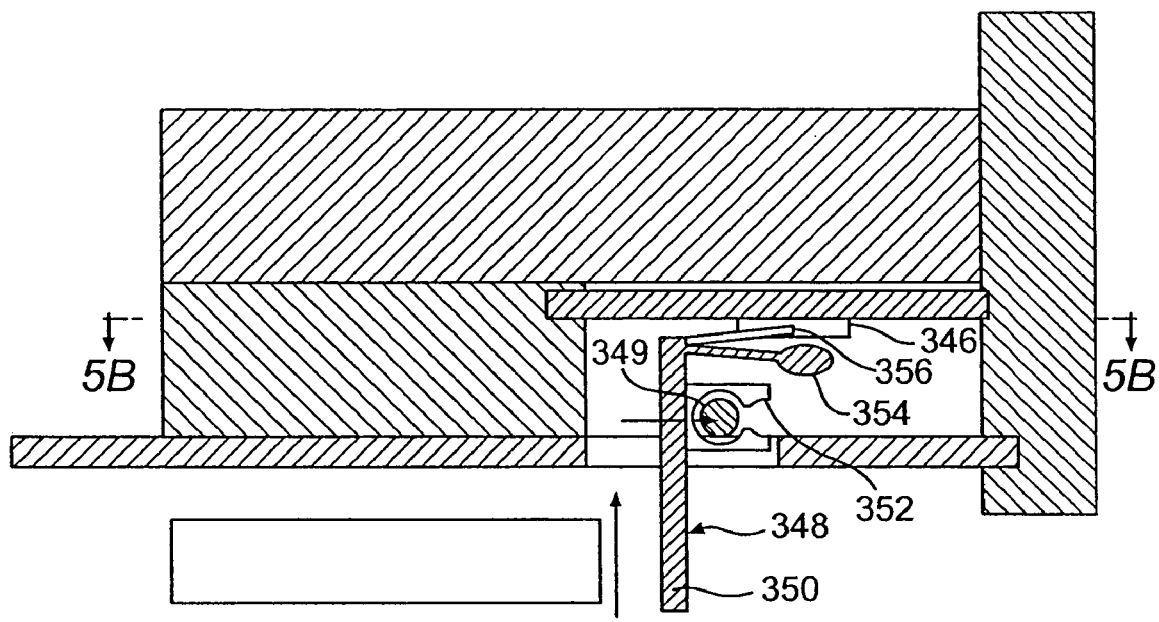
FIG. 5A is a cross-section of an elevational view of the lever actuating system of the present invention.
Figure 5B:
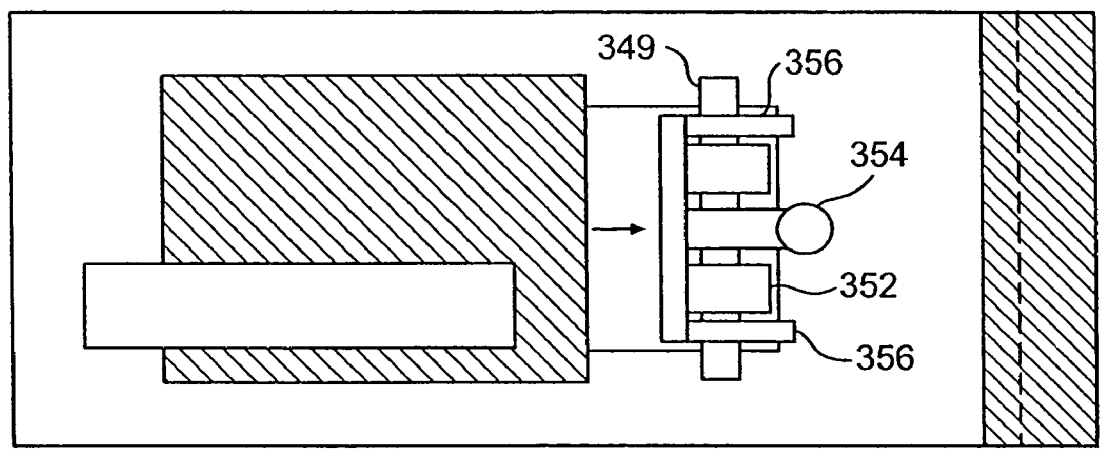
FIG. 5B is a cross-sectional view taken along section line 5B—5B of FIG. 5A.

The connected valve body 310 and diverter block 330 can be mounted on a lower base plate 340. Base plate 340 can be mounted to back plate 302 by any suitable manner. The base plate includes a nozzle hole 342 as well as a switch hole 344. A membrane 346 covers switch hole 344 in a water-tight manner. A membrane switch 345 for actuating the valve assembly can be positioned on base plate 340 above membrane 346. Pressure applied to membrane 346 can actuate the membrane switch. A lever 348 is mounted underneath base plate 340 and includes an actuation arm 350, which can be pressed by an operator, a fulcrum clip 352 and a switch activating arm 354. Operation of lever 348 forces actuation arm 354 to depress membrane 346 to activate membrane switch 345. Referring to FIGS. 5A and 5B, fulcrum clip 352 can be attached to a shaft 349 provided on the tower 400 or on base plate 340. Spring arms 356 of lever 348 contact spring clips 358 connected to base plate 340 to return the lever to its unactuated position. This design can be tolerant of excessive activation force by a user without damage to the switch.

A power supply cable 360 can supply power to the valve assembly. A cover 370 can fit over the entire valve assembly and connect with base plate 340. Although the valve assembly operates in a liquid environment, both membrane 346 and cover 370 can prevent a liquid from entering the interior of the valve assembly.

Figure 6A:
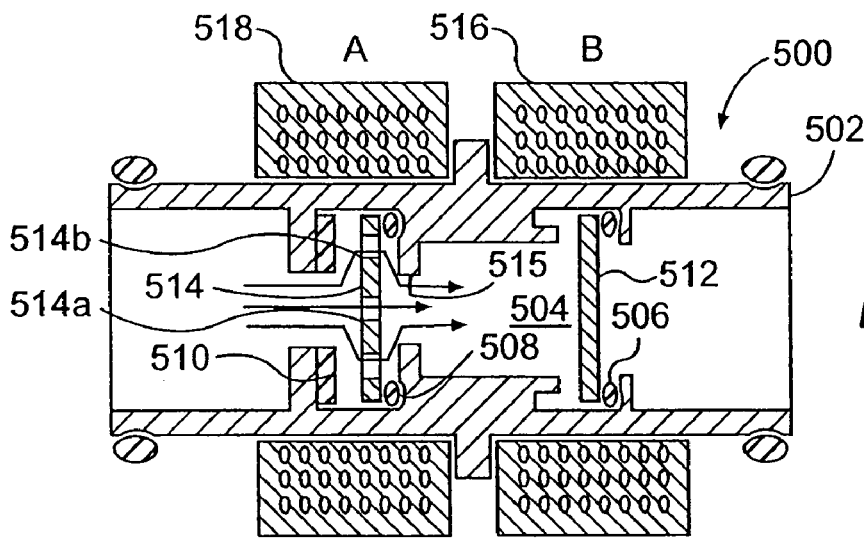
FIGS. 6A–6C are sectional views of a flow control valve used in a valve assembly according to a second embodiment of the present invention.
Figure 6B:
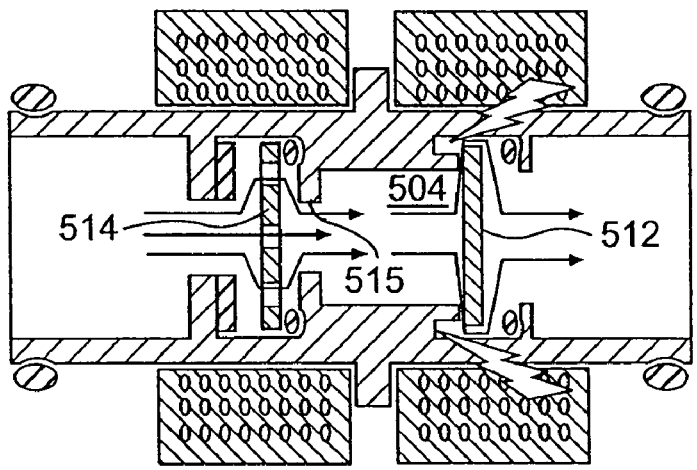
Figure 6C:
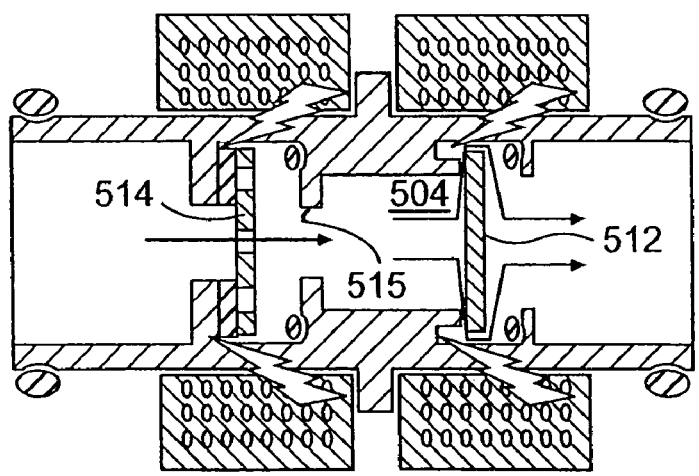

An alternative to the flow control units described with respect to FIGS. 3A and 3B will be described in respect to FIGS. 6A–6C. A typical flow control module 500 to be used in place of flow control modules 24 and 26 is shown in these figures. Flow control module 500 includes a housing 502 that defines a flow passage of the water or concentrate. Valve seats 506, 508 and 510 are provided in flow passage 504. A maximum flow restriction orifice 515 is positioned in the flow passage between seats 508 and 506. In addition, flow control disks 512 and 514 are also provided in flow passage 504, with disk 512 seating on valve seat 506 and disk 514 seating on valve seats 508 and 510. Disk 512 is of solid construction and disk 514 includes central restriction orifice 51 4a and outer through-holes 514b. Each disk 512, 514 is movable between a downstream and an upstream position. In the figures, the liquid flow is from left to right, so the left position of each disk is the upstream position and the right position is the downstream position. The disks are caused to shuttle between the two positions by solenoids 516, 518. When no power is applied to the solenoids, the disks will assume the downstream position, biased by the fluid flow. When the solenoids are energized, the disks are moved leftward against the fluid flow to the upstream position.

Disk 512 is used to open and close the valve. In the position of FIG. 6A, the valve is closed and in FIGS. 6B and 6C the valve is open. Disk 514 is used to control the flow rate through the valve. The flow rate limits are set by the size of orifices 514a and 515. Opening orifice 514a sets the minimum flow rate and opening orifice 515 sets the maximum flow rate. When solenoid 518 is not energized, disk 514 assumes the downstream position and all openings 514a and 514b are open to allow the maximum flow rate, as shown in FIG. 6B. To achieve the minimum flow rate, solenoid 518 is energized to force disk 514 against the flow of the liquid and seal openings 514b against valve seat 510 so that only restrictive orifice 514a allows flow. The sum of the areas of the holes 514b in disk 514 is greater than the area of opening 515. As a result, only a small change in pressure is required to move disk 514 from the downstream position (maximum flow rate) to the upstream position (minimum flow rate).

In order to achieve a flow rate between the maximum and the minimum, power to solenoid 518 is pulse-width modulated to achieve the desired average flow rate. The design configuration for solenoid 518 does not require a high voltage to move disk 514 to the upstream position. The amount of travel distance and the mass of disks 512, 514 are designed to be small to allow the valve to respond quickly to PWM changes to regulate the average flow rate. The range of orifice sizes for the water flow control valve is 0.1–0.25 inches, while the range of orifices sizes for the syrup flow control module is 0.020–0.110 inches. This linear flow-through design allows smooth flow without significant pressure drop.

Figure 7:
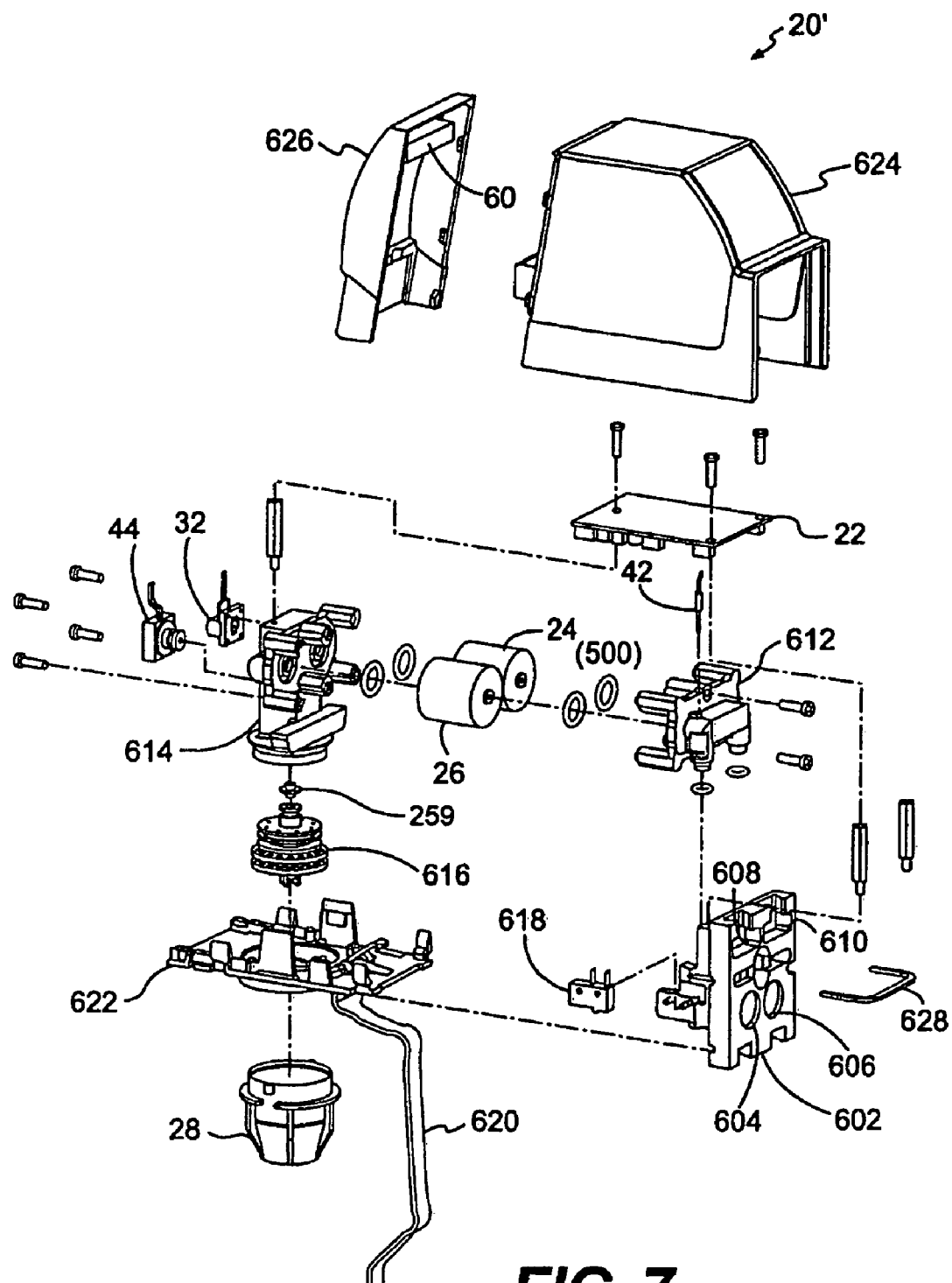
FIG. 7 is an exploded perspective view of the valve assembly according to the second embodiment of the present invention.

The physical structure of the valve assembly 20' according to the second embodiment differs somewhat from that of the first embodiment and is shown in more detail in FIG. 7. Valve assembly 20' includes an inlet mounting plate 602 that is mountable on a conventional beverage dispensing tower or fountain base (not shown). Plate 602 includes inlet orifices 604, 606 for receiving concentrate and carbonated water supplied from the fountain base, and mounting holes 608, 610 that engage with complementary mounting lugs on the fountain base. A fluid inlet body 612 is connected to mounting plate 602. A fluid outlet body 614 connects with fluid inlet body 612. Flow control regulators 500 (24, 26) can be sandwiched between fluid inlet body 612 and fluid outlet body 614 to define separate water and concentrate flow passages. O-rings can be positioned at every fluid junction to prevent leakage. Outlet passages 25 and 27 are defined in fluid outlet body 614 similar to the elements shown in FIG. 2. Water flow sensor 32 and concentrate pressure sensor 44 can be mounted on outlet body 614 to measure the flow rate and pressure of the water and syrup flows, respectively. Syrup temperature sensor 42 can be provided in the concentrate flow passage in fluid inlet body 612. Outlets of fluid outlet body 614 flow into nozzle 28. A diffuser 616 can be positioned between fluid outlet body 614 and nozzle 28 to ensure adequate mixing of the concentrate and water. Restriction 259 can be placed in line between diffuser 616 and the syrup outlet of fluid outlet body 614.

A conventional switch 618 for activating the valve assembly can be mounted on fluid inlet mounting plate 602 and activated by a lever 620, as is known in the art. Alternatively, the membrane switch of the first embodiment can be used. Lever 620 is pivotally mounted on base plate 622 which receives fluid outlet body 614. Controller 22, which can be in the form of an electronic circuit board, can be mounted on top of connected inlet mounting plate 602, fluid inlet body 612 and fluid outlet body 614.

Figure 8:
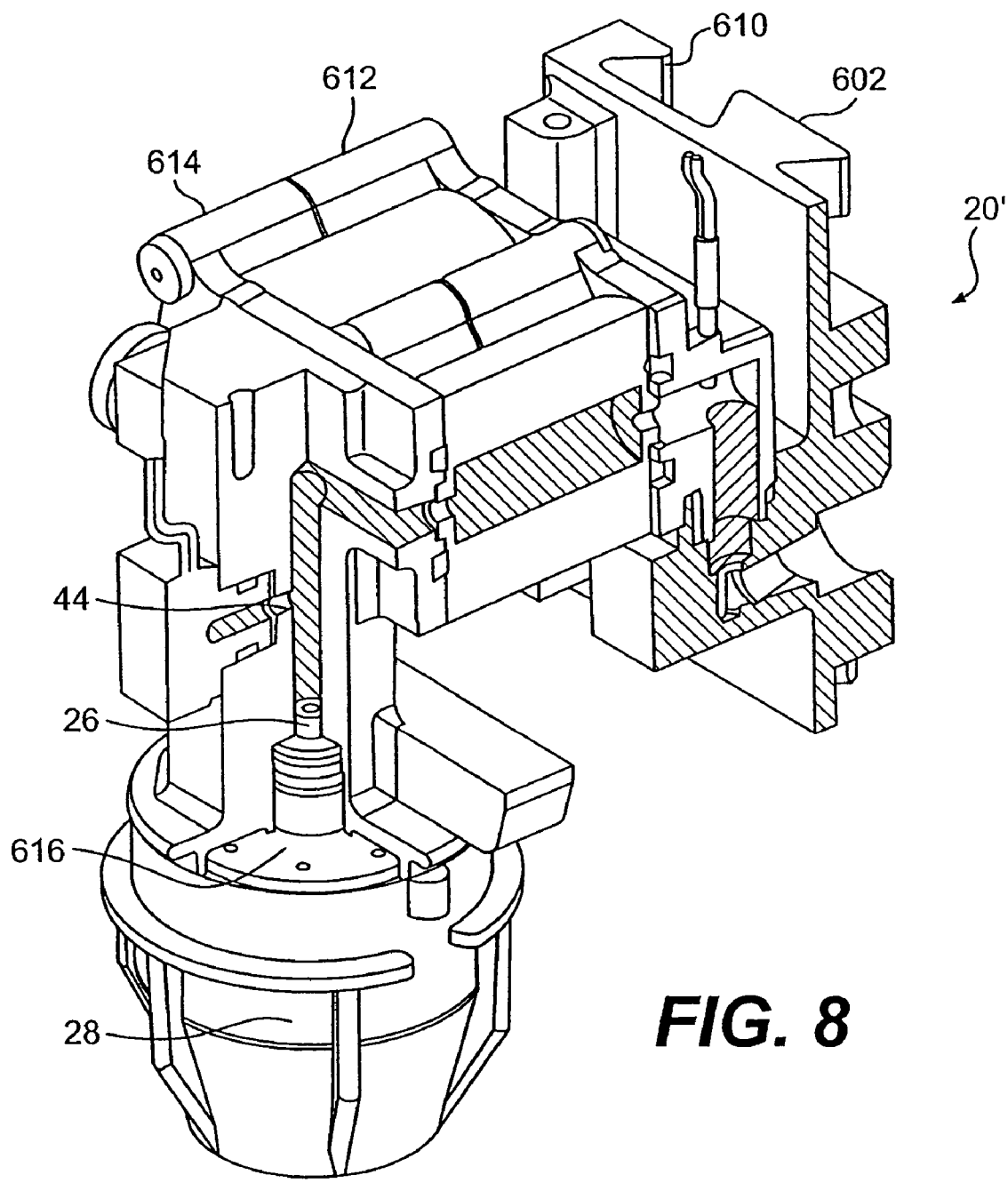
FIG. 8 is a partial assembled perspective view of the valve assembly according to the second embodiment of the present invention.

The inner components of the valve assembly can be covered by rear valve cover 624 and front valve cover 626, which will be visible to the operator. Syrup identification unit 60 can be mounted in front cover 626. Front cover 626 can include indicia to visibly identify the type of syrup for a user and syrup identification unit 60 can provide electronic identification of the concentrate to the controller 22. After mounting on the tower or base with mounting lugs inserted in recesses 610, a retaining clip 628 can be used to secure the valve assembly 20' to the tower. Fluid inlet body 612 and fluid outlet body 614 can be connected by screws or any other adequate means. The circuit board of controller 22 can also be mounted by screws. Front and rear valve covers 624, 626 can engage the base plate 622. A partial assembled view of valve assembly 20' is shown in FIG. 8.

Although specific embodiments of the present invention have been described above in detail, it will be understood that this description is merely for purposes of illustration. Various modifications of the disclosed aspects of the preferred embodiments, in addition to those described above, may be made by those skilled in the art without departing from the spirit of the present invention defined in the following claims, the scope of which is to be accorded the broadest interpretation so as to encompass such modifications and equivalent structures.

We claim:

1. A dispensing apparatus for dispensing a beverage formed by mixing a diluent and a concentrate at a target ratio, said apparatus comprising:
   a diluent flow control valve formed of a first valve seat and a first poppet received within said first valve seat, said first poppet having a simple shape; and
   a concentrate flow control valve formed of a second valve seat and a second poppet, said second poppet having a more compound shape than the shape of said first poppet.

2. The apparatus according to claim 1 wherein said second poppet is formed of two or more sections of simple shapes serially connected.

3. The apparatus according to claim 2 wherein said second valve seat is of a simple shape of dimensions complementary to one of the two or more sections forming said second poppet.

4. The apparatus according to claim 3 wherein one of the two or more sections forming said second poppet is used in conjunction with said second valve seat to control the flow rate of a first concentrate and another of the sections is used to control the flow rate of a second concentrate having a different viscosity than that of the first concentrate.

5. The apparatus according to claim 1 wherein said first poppet has a simple conical shape and said second poppet is formed of at least two conical sections of different sizes and serially connected.

* * * * *